United States Patent
Schatz et al.

[11] 3,845,979
[45] Nov. 5, 1974

[54] CHARGING DEVICE
[75] Inventors: Oskar Schatz, Harburg-Neu Leversen; Uwe Dieckmann, Hamburg, both of Germany
[73] Assignee: Fried Krupp Gesellschaft mit beschrankter Haftung, Essen, Germany
[22] Filed: Apr. 5, 1973
[21] Appl. No.: 348,211

[30] Foreign Application Priority Data
Apr. 12, 1972 Germany............................ 2217589

[52] U.S. Cl..................... 294/88, 294/86 R, 294/97
[51] Int. Cl................................................. B66c 1/54
[58] Field of Search............ 294/67 R, 67 B, 67 BC, 294/86 R, 88, 93, 95, 97; 214/1 B, 1 BC; 425/32, 36, 38, 43

[56] References Cited
UNITED STATES PATENTS
| | | | |
|---|---|---|---|
| 2,952,886 | 9/1960 | Mazarakis.......................... | 294/88 X |
| 3,343,208 | 9/1967 | Pacciarini et al..................... | 425/38 |
| 3,393,807 | 7/1968 | Sylvester et al.................... | 294/97 X |
| 3,530,533 | 9/1970 | Turk et al........................ | 425/36 X |
| 3,544,151 | 12/1970 | Stokes............................. | 294/93 X |
| 3,720,435 | 3/1973 | Leyn.................................. | 294/88 |

Primary Examiner—Richard A. Schacher
Assistant Examiner—Johnny D. Cherry
Attorney, Agent, or Firm—Walter Becker

[57] ABSTRACT

A device for handling tire carcasses, especially for handling the carcass in connection with a tire press in which a generally horizontal frame has circumferentially spaced fingers moveably connected thereto and depending from the frame. An actuating device is connected to each finger for moving the fingers radially so that the fingers can be introduced inside a bead region of a tire carcass and then moved radially outwardly to grip the tire carcass by the bead region while centering the tire on a predetermined axis and holding the tire carcass in a horizontal position. The device is adapted for being moveably supported for transporting the tire carcass gripped thereby.

7 Claims, 3 Drawing Figures

CHARGING DEVICE

The present invention relates to a charging device for a pneumatic tire press for a precise central insertion of a raw tire to be transported in lying condition, into the tire mold by means of a plurality of at least nearly radially movable gripper fingers which are distributed over the circumference of the raw tire and which grasp the raw tire from above below the upper head.

Heretofore known charging devices of the general type referred to above are equipped with an actuating mechanism which requires a relatively great structural height above the raw tire to be transported and which also requires the space defined by the tire bead. In this way, an operation of the press is impossible during which while the charging device is in the press, the curving bellows or another structural member extends into the raw tire. Moreover, a relatively large stroke is necessary for closing the press. In order to be able to keep this stroke short, so-called outer gripper charging devices are employed which catch the raw tire at its outer circumference and insert the same into the press in the same position in which the press has received the raw tire, for instance, from a tire building machine. Deviation of shape between the outer contour and the bead of the raw tire are, however, likewise conveyed. Furthermore, the raw tire is carried on its lower side wall which means, especially if the tire is soft, it can, more or less, easily collapse so that also with this type of charging device the danger of faulty pressing operations exist.

It is an object of the present invention to avoid the above mentioned drawbacks of heretofore known charging devices and to assure a simple and safe operative insertion of the raw tire in a centered position into the press.

These and other objects and advantages of the invention will appear more clearly from the following specification, in connection with the accompanying drawings, in which.

Figure 1:
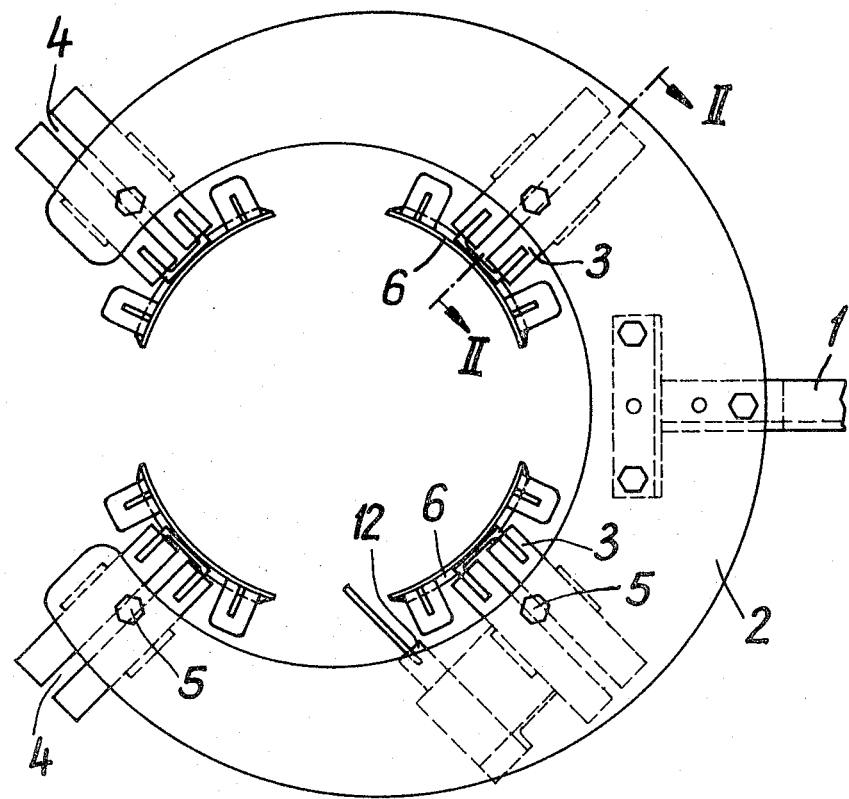
FIG. 1 is a top view of a charging device according to the invention.

A charging device for a pneumatic tire press for precisely centrally inserting a raw tire to be transported in lying condition into the tire mold with a plurality of at least radially movable gripper fingers which are distributed over the circumference of the raw tire, and in which the gripper fingers grasp from above below the upper bead of the raw tire.

The charging device according to the invention is characterized in that the gripper fingers are each provided with a hydraulic or pneumatic drive for the radial movement which with regard to the tire bead is located radially outwardly on the respective gripper finger.

As radial movement, a tilting movement may be considered, which means that the gripper fingers are pivotally journalled around shafts which are tangential to the bead counter. It is here that the substantially horizontally operable drives engage above or below the shafts. With this embodiment only that much of the space within the tire bead is used for the charging device which corresponds to the thickness of the gripper fingers. In view of the flat drive, also the structural height is rather short.

According to a further development of the invention, the drive for the radial movement of the gripper fingers is equipped with lift limiting means. As a result thereof, each drive can be adjusted as to its end position in conformity with the coaxial position of the gripper fingers with regard to the central axis, which forms the precondition for a proper repeatable centering of the raw tires.

Expediently, the gripper fingers are equipped with holding means by which the gripper fingers are adjustable in radial direction and connected to the bottom side of a supporting body which has a central recess of at least the magnitude of the bead diameter of the largest raw tire to be transported and has a cut between two holding means which cut is open radially outwardly from the central recess. In this way, the charging device can be set without difficulties in conformity with the adjusting stroke of the holding means for different tire sizes without the necessity of resetting the gripper fingers or the drive therefor. It is possible to employ very simple drives for the gripper fingers without adjustable lift limiting means, or the like, because deviations in the end positions of the individual drives with regard to each other from the circular shape necessary for a precise centering of the tire bead can be compensated for by the adjustment of the holding means. The design of the charging device in the form of an open ring permits, for instance, that the charging device after insertion of the raw tire be tilted outwardly from the range of the tire form only when the curving bellows moved upwardly from the lower tire mold section is at its upper end held by a centering bar moved downwardly from the upper tire mold section.

It is furthermore suggested according to the present invention to provide the gripper fingers with an upper abutment for the bead of the raw tire with regard to its location as to height. This abutment prevents the raw tire from occupying an inclined position when the tire is picked up by the charging device, and thus will also assure an insertion in a horizontal position into the tire mold.

Figure 2:
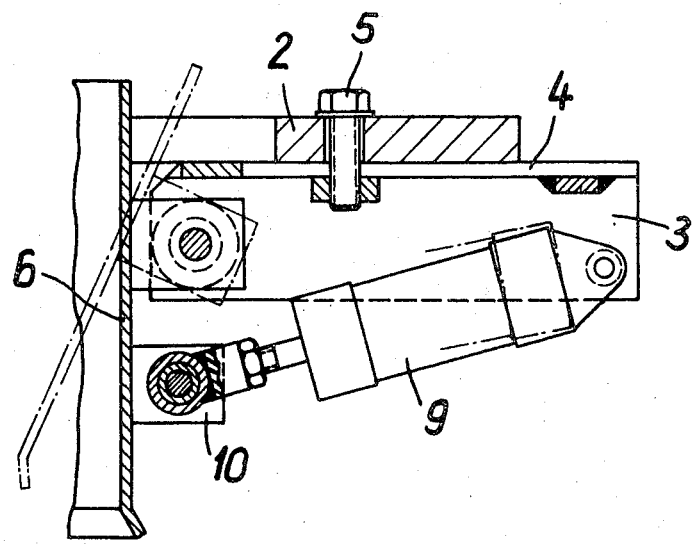
FIG. 2 represents a section taken along the line II-II of FIG. 1.
Figure 3:
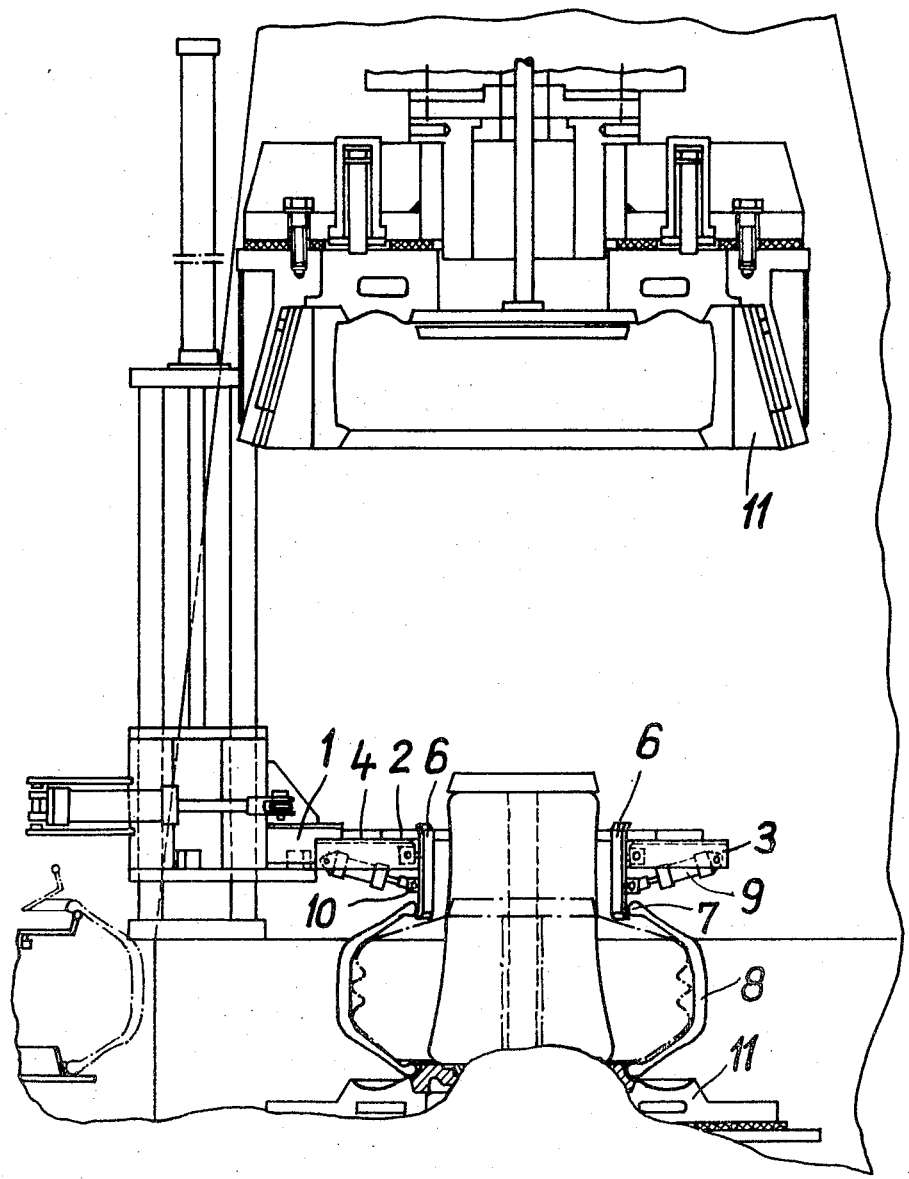
FIG. 3 is an overall view of the press during the insertion of a raw tire.

Referring now to the drawings in detail, the arrangement shown therein comprises a movable pivotable arm 1 of a pneumatic tire press on which arm there is connected a supporting body 2 in the form of an open ring. Below the supporting body 2 and distributed over the circumference thereof are four holding members which are adjustable in radial direction through slots 4 and screws 5 for adaptation to different diameters of the raw tire. Linked to each holding member 3 is a gripper finger 6 which is adapted to be pivoted from the position shown in dash lines in FIG. 2 to the vertical position in order to catch below the head 7 of a raw tire 8 and to carry the same (FIG. 3). The pivoting of the gripper finger 6 is effected by a hydraulically or pneumatically operable drive 9, the linkage connection of which to the gripper finger 6 serves as upper abutment 10 for the bead 7 when receiving the raw tire 8 and prevents an inclined position of the raw tire. The holding members 3 are respectively so adjusted that the pulled-in end position of the drives 9 in vertical position of the gripper finger 6 corresponds to the precisely centered position of the raw tire 8 in the tire mold 11. A limit switch 12 serves as a control to indicate whether a raw tire is in the charging device.

It is, of course, to be understood that the present invention is, by no means, limited to the particular showing in the drawings, but also comprises any modifications within the scope of the appended claims.

What is claimed is:

1. In a device for handling tire carcasses, especially for handling tire carcasses in horizontal position in connection with a tire press; a frame, a plurality of gripper fingers moveably mounted in said frame in circumferentially distributed relation therein and depending therefrom, and drive means in said frame disposed radially outside said fingers and connected to the radially outer sides of said fingers for moving said fingers radially for gripping a tire carcass by engagement of a bead region thereof from the inside, said frame being in the form of a horizontally disposed substantially "C" shaped plate, the central aperture in said plate being at least as large in diameter as the tire carcass bead to be gripped, support members secured to the underside of said plate, said fingers and the said drive means therefor being connected to and supported by said support members, each finger having a respective drive means and each finger and the drive means therefor being carried by a respective support member, each support member being radially adjustable on said "C" shaped plate.

2. A device according to claim 1 which includes means for limiting the radial movement of said fingers in said frame.

3. A device according to claim 1 in which each finger on the radially outer side comprises abutment means for axial engagement with the tire carcass bead to be gripped.

4. A device according to claim 1 in which said drive means comprises a fluid motor connected between said frame and the radially outer side of each said finger.

5. A device according to claim 1 in which each finger is curved in cross section so as to be concave toward the central vertical axis of the frame.

6. A device according to claim 5 in which each finger at the axially lower end and at least on the radially outer side flares radially outwardly.

7. A device according to claim 1 in which said frame is adapted for being moveably supported for transporting a tire carcass engaged by said fingers.

* * * * *